July 21, 1936.  S. BEGUN  2,048,488
ELECTROMAGNETIC TALKING MACHINE
Filed May 18, 1935
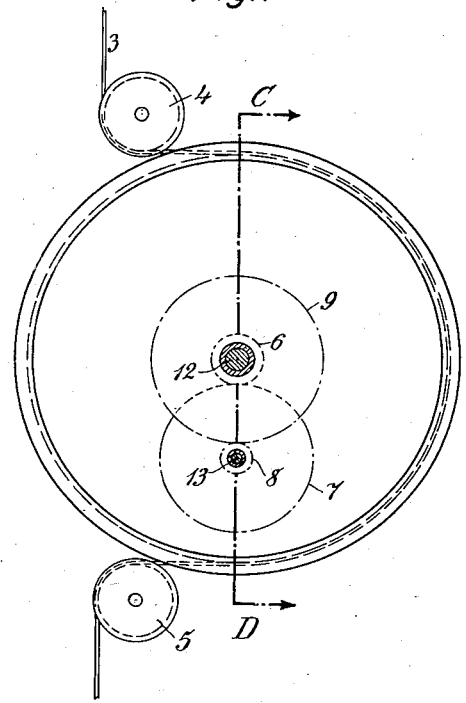
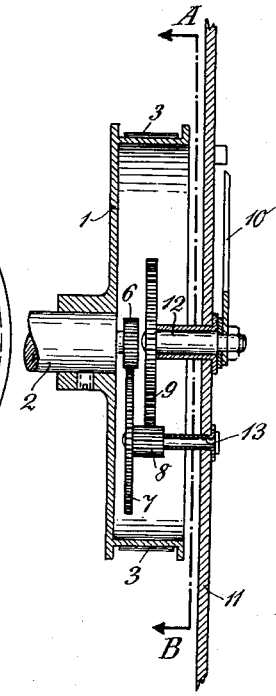
Inventor:
Semi Begun
by R.C. Hopgood
Attorney Patented July 21, 1936

2,048,488

UNITED STATES PATENT OFFICE 2,048,488

ELECTROMAGNETIC TALKING MACHINE

Semi Begun, Berlin, Germany, assignor to C. Lorenz Aktiengesellschaft, Berlin-Tempelhof, Germany, a company Application May 18, 1935, Serial No. 22,142
In Germany May 29, 1934

2 Claims. (Cl. 33—129)

The invention relates to electromagnetic talking machines of the kind having a steel tape or wire arranged to serve as a record carrier.

Devices of this type are known wherein means are connected to the power shaft for indicating how much of this steel tape or wire has been coiled or uncoiled at any time. From such indication the beginning and the end of a record may be ascertained at any moment.

In the novel arrangement the driving wheel engaging the tape or wire is made to encompass the gearing by which the pointer of the indicating device is coupled with the shaft of this wheel, i. e. the power shaft of the talking machine. The arrangement is preferably such that the axis of rotation of the pointer is in line with the power shaft. In this way the indicating device is given a construction which is simple and forms a protective casing to the gearing.

The invention will be understood from the following description and be particularly pointed out in the appended claims, reference being had to the accompanying drawing in which Fig. 1 is a sectional view, the section being on the line A—B of Fig. 2, and Fig. 2 a section on the line C—D of Fig. 1.

Fixed on a power shaft 2 is a wheel 1 engaging a steel tape 3 which is the sound record carrier. The tape is arranged to pass around a pulley 4 onto wheel 1 and thence around a pulley 5. A pinion 6, fastened to shaft 2, meshes with a toothed wheel 7 rigidly connected with a pinion 8. The axle 13 of the wheels 7, 8 is rotatably mounted in a plate 11. Meshing with pinion 8 is a toothed wheel 9 whose axle 12 is likewise rotatably mounted in plate 11. The axle 12 is in line with shaft 2 and carries a pointer 10 arranged in front of the plate 11. The wheel 1 is hollow and the wheels 6, 7, 8, 9 are located within it, as will be seen from Fig. 2, the plate 11 being disposed at the open face end of the wheel 1.

The pointer 10 in a well known manner indicates how far the tape 3 has been moved at any moment.

What is claimed is:

1. In an electromagnetic talking machine of the type used with flexible record filaments, a record driving wheel having a hollow in one end adapted to engage such a record filament over at least half the circumference of said wheel, a stationary plate positioned adjacent that end of said wheel which has said hollow, a train of gears mounted on said plate and positioned inside the hollow of said wheel, a gear fixed to said wheel and in engagement with said train whereby the train of gears is actuated by rotation of said wheel, and a pointer on the side of said plate remote from said wheel, said pointer being rotatable by said train of gears in response to the rotation of said wheel.

2. In an electromagnetic talking machine of the type used with flexible steel record tapes, a stationary frame plate, a pointer mounted on said plate so as to be rotatable adjacent one face of the plate, a train of gears mounted on the opposite face of the plate and connected to actuate said pointer, a power shaft connected to actuate said train of gears, said shaft being coaxial with the axis of rotation of said pointer, and a hollow wheel fixed to said shaft and surrounding said gears, said wheel being adapted to engage a record tape over a substantial part of the wheel's circumference whereby said tape is driven simultaneously with said pointer in response to the rotation of said shaft.

SEMI BEGUN.